United States Patent
Liu et al.

(10) Patent No.: US 11,188,339 B2
(45) Date of Patent: Nov. 30, 2021

(54) SYSTEM AND METHOD FOR AN EXTERNAL PROCESSOR TO ACCESS INTERNAL REGISTERS

(71) Applicant: 5V Technologies Ltd., Taipei (TW)

(72) Inventors: Chuan-Wei Liu, Taipei (TW); Wei-Pin Chen, Taipei (TW)

(*) Notice: Subject to any disclaimer, the term of this patent is extended or adjusted under 35 U.S.C. 154(b) by 0 days.

(21) Appl. No.: 16/860,073

(22) Filed: Apr. 28, 2020

(65) Prior Publication Data

US 2020/0387376 A1    Dec. 10, 2020

Related U.S. Application Data

(60) Provisional application No. 62/857,829, filed on Jun. 6, 2019.

(51) Int. Cl.
*G06F 9/38* (2018.01)
*H04L 29/12* (2006.01)
*G06F 9/30* (2018.01)

(52) U.S. Cl.
CPC .......... *G06F 9/384* (2013.01); *G06F 9/30101* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 2016/0205224 A1* | 7/2016 | Chini | H04L 69/323 455/422.1 |
| 2018/0101323 A1* | 4/2018 | Sebastian | G06F 3/0659 |
| 2020/0036717 A1* | 1/2020 | Akella | H04L 12/4625 |

* cited by examiner

*Primary Examiner* — Scott C Sun
(74) *Attorney, Agent, or Firm* — Opes IP Consulting Co. Ltd.

(57) ABSTRACT

The disclosure provides a system and method for an external processor to access internal register. The internal register may be a register of a core networking device. The method includes: sending, by an external processor, a read request to a core networking device; responding, by the core networking device, to the read request; sending, by the external processor, a write request to the core networking device; and preparing, by the core networking device, a register status notification of a register embedded in the core networking device and sends the register status notification to the external processor in response to the write request. The read and write requests and the responses are in a layer 2 protocol (L2 protocol).

8 Claims, 4 Drawing Sheets

SYSTEM AND METHOD FOR AN EXTERNAL PROCESSOR TO ACCESS INTERNAL REGISTERS

CROSS REFERENCE TO RELATED APPLICATION

The present application claims priority to U.S. Provisional Application Ser. No. 62/857,829, filed on Jun. 6, 2019, which are hereby incorporated by reference in their entirety.

FIELD

This disclosure relates to a system and method for an external processor to access internal registers, and more particularly, to a networking system in which an external processor is relied on to access (read/write) an internal register.

BACKGROUND

A processor register (aka, CPU register) is one of a small set of data holding places that are part of the computer processor. A processor register is a quickly accessible location available to a computer's central processing unit (CPU). A register may hold an instruction, a storage address, or any kind of data (such as a bit sequence or individual characters). Some instructions specify registers as part of the instruction. For example, an instruction may specify that the contents of two defined registers be added together and then placed in a specified register.

Almost all computers, whether load/store architecture or not, load data from a larger memory into registers where it is used for arithmetic operations and is manipulated or tested by machine instructions. Manipulated data is then often stored back to main memory, either by the same instruction or by a subsequent one. Modern processors use either static or dynamic RAM as main memory, with the latter usually accessed via one or more cache levels.

Processor registers are normally at the top of the memory hierarchy, and provide the fastest way to access data. The term normally refers only to the group of registers that are directly encoded as part of an instruction, as defined by the instruction set. However, modern high-performance CPUs often have duplicates of these "architectural registers" in order to improve performance via register renaming, allowing parallel and speculative execution.

When a computer program accesses the same data repeatedly, this is called locality of reference. Holding frequently used values in registers can be critical to a program's performance. Register allocation is performed either by a compiler in the code generation phase, or manually by an assembly language programmer.

FIG. 1 illustrates a conventional system 1 in which a processor and a register are integrated with. In the system 1, the processor 11 and the register 12 are connected, through any sorts of connection (e.g., bus). The processor 11 can access the register 12. In certain situation, the processor 11 may only read the register, 12, in some situation, the processor 11 may only write the register 12. However, in some other situations, both read and write are allowable.

SUMMARY OF THE DISCLOSURE

The present disclosure relates to a system and method for an external processor to access an internal register, and more particularly, to a networking system in which an external processor is relied on to access (read/write) an internal register.

The method for accessing a register of a core networking device includes: sending, by an external processor, a read request to the core networking device; responding, by the core networking device, to the read request; sending, by the external processor, a write request to the core networking device; and preparing, by the core networking device, a register status notification of the register and sends the register status notification to the external processor in response to the write request. The read and write requests and the responses are in a layer 2 protocol (L2 protocol).

The networking system, in which an external processor is relied on to access (read/write) the internal registers, includes: a core networking device having a register embedded therein; and an external processor, connected with the core networking device through an Ethernet protocol. The external processor sends a read request to the core networking device, the core networking device responds to the read request, the external processor then sends a write request, the core networking device prepares a register status notification of the register and sends the register status notification to the external processor in response to the write request. The read and write requests and the responses are in a layer 2 protocol (L2 protocol).

BRIEF DESCRIPTION OF THE DRAWINGS

FIG. 1 illustrates a conventional system in which a processor and a register are integrated with;

DETAILED DESCRIPTION

Unless defined otherwise, all technical and scientific terms used herein have the same meanings as commonly understood by one of skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
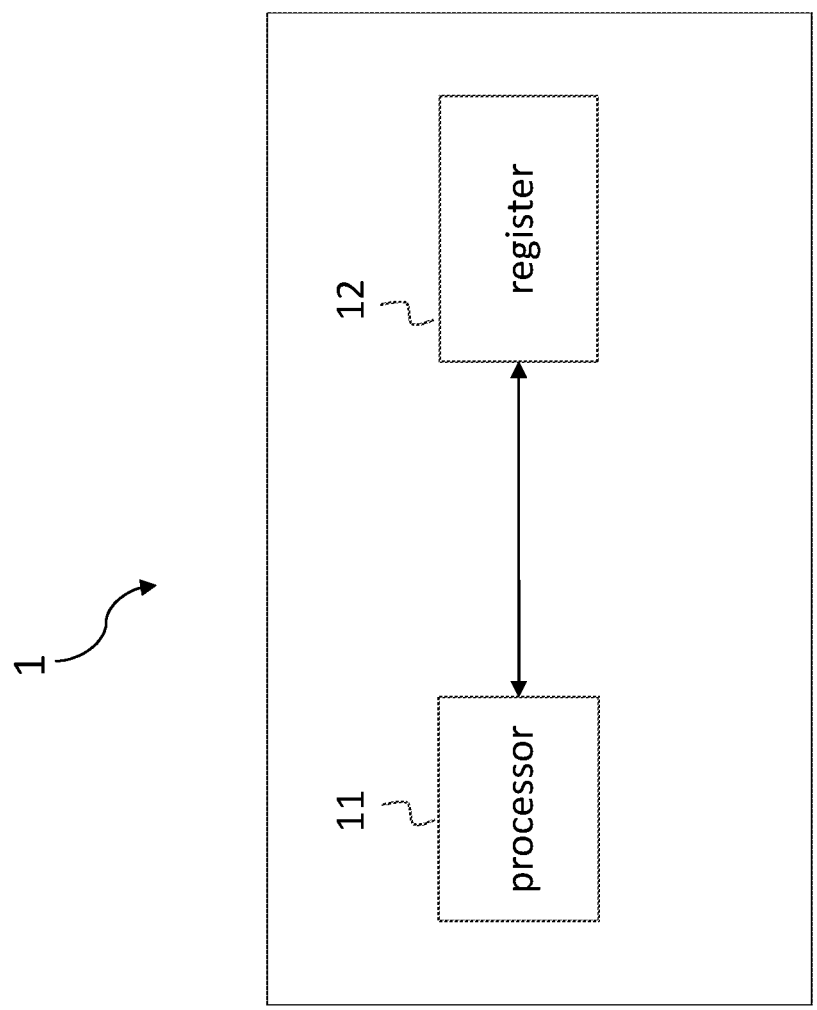
Figure 2:
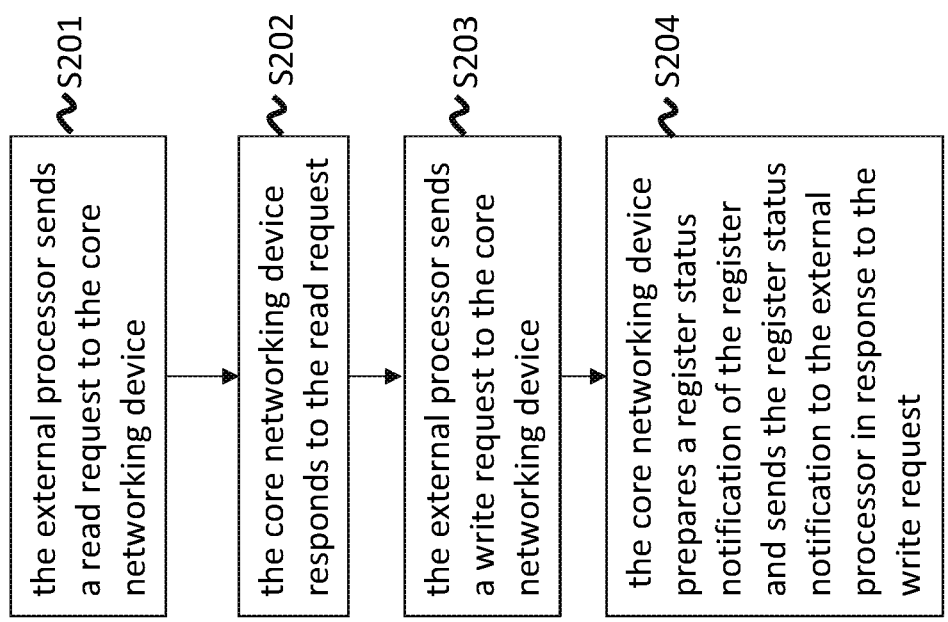
FIG. 2 illustrates a flowchart of a method for an external processor to access an internal register of a core networking device according to the present disclosure.

Reference is first made to FIG. 2, which is a flowchart of a method for an external processor to access an internal register of a core networking device. According to the present embodiment of the present disclosure, the external processor and the core networking device are connected through an Ethernet protocol, and the internal register is embedded in the core networking device.

First, in step S201, the external processor sends a read request to the core networking device. In step S201, it should be understood that the external processor intends to access the internal register. Next, in step S202, the core networking device responds to the read request. The core networking device may, according to its current status, allow or reject the read request. If the core networking device allows the read request, next the method proceeds to step S203, the external processor sends a write request to the core networking device.

After the core networking device receives the write request, the method moves to step S204, the core networking device prepares a register status notification of the register and sends the register status notification to the external processor in response to the write request. It should be noted that, the read and write requests, and all the responses as described above are transmitted in a layer 2 protocol (L2 protocol). The external processor, after receiving the register status notification, further acknowledges to the notification, through an ACK message.

As described, the external processor and the core networking device are connected through Ethernet protocol, this means that the read/write requests need to be encoded into a specific data format (a special data packet, i.e., an Ethernet protocol compatible packet format) so that the requests can be transmitted over Ethernet.

Figure 3:
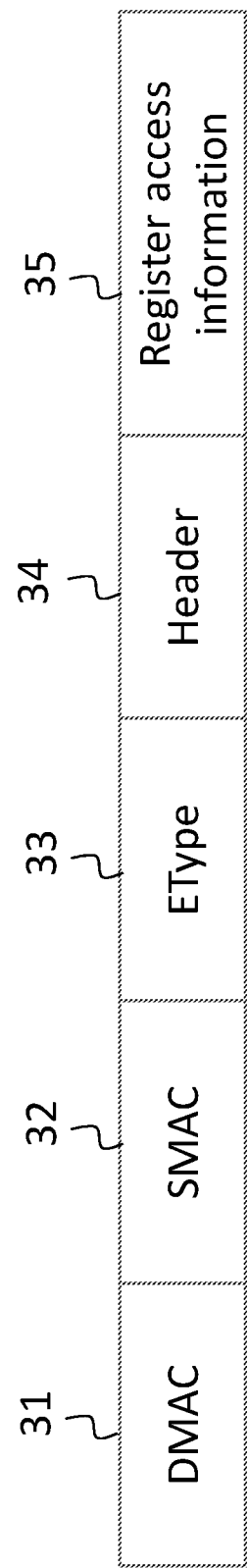
FIG. 3 illustrates an Ethernet protocol compatible packet format according to an embodiment of the present disclosure.

Accordingly, reference is collectively made to FIG. 3, which illustrates the Ethernet protocol compatible packet format according to the embodiment of the present disclosure. In FIG. 3, the Ethernet protocol compatible packet format include a destination MAC (DMAC) address section 31, a source MAC (SMAC) address section 32, an Ether type section 33, a header 34 and a register access information section 35.

To be more specific, the DMAC address 31, the SMAC address 32 and the Ether type 33 sections respectively takes up 6 bytes, 6 bytes and 4 bytes in the format 3. The header 34 is for register access via Ethernet. It can be in a standard format, or can be defined by users to convey register access or event notification over Ethernet packets.

The register access information section 35 may include, but not limited to, register read/write operation, register number for addressing and content read/write from/to the register. The content for event notification is also included in this field.

Comparing to prior art, which have one or more processors and registers embedded in a core networking device, the core networking device of the present disclosure need not to leave space for processors, since processors are moved out. In this regard, the core networking device of the present disclosure can save more die area when manufacturing, as well as design time/cycle. Moreover, since the core networking device does not perform processor(s) accessing register (s), power consumption can be saved. Last but not the least, man power and cost can also be saved.

Figure 4:
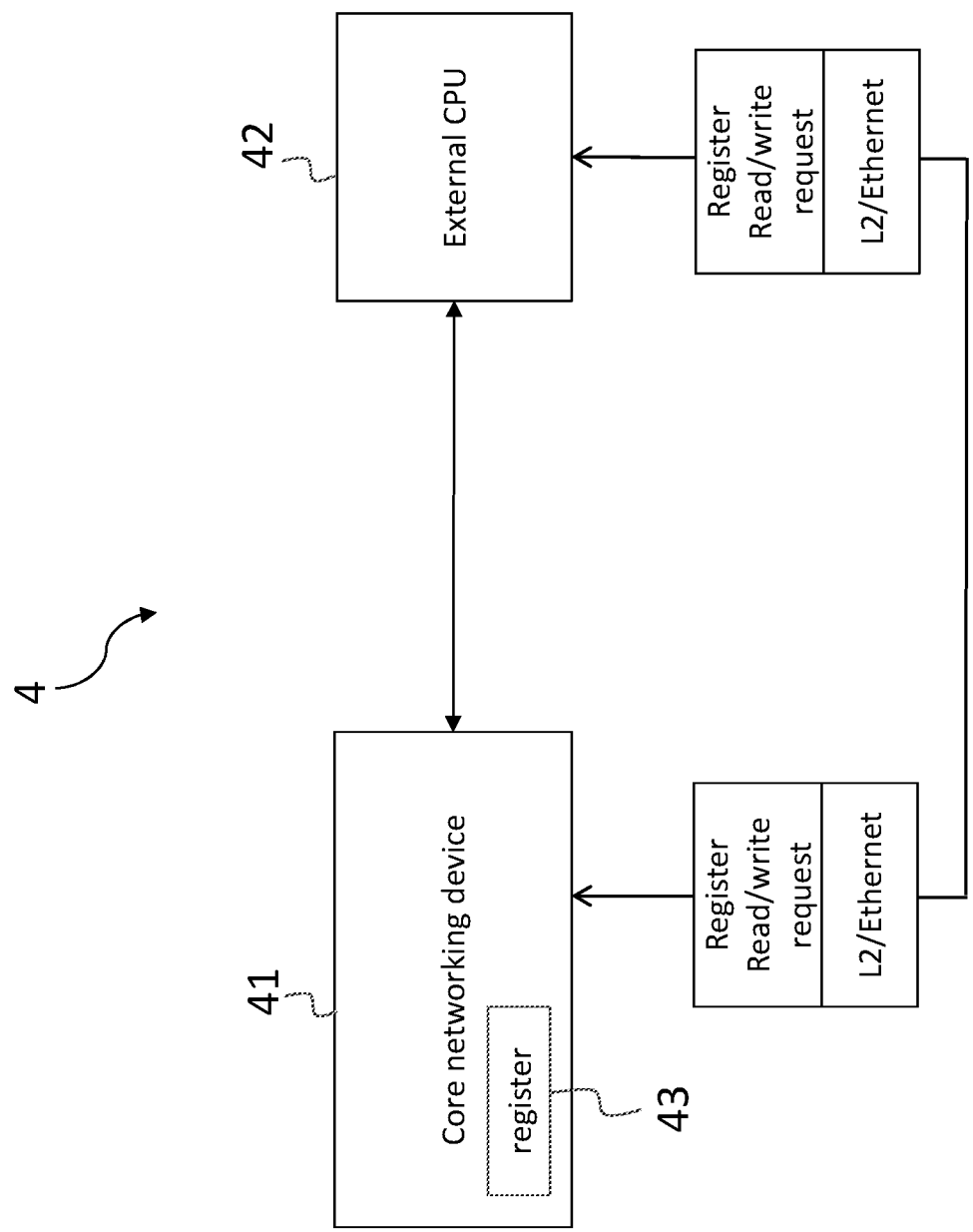
FIG. 4 illustrates a networking system according to an embodiment of the present disclosure.

Reference is next made to FIG. 4, which illustrates a networking system 4. The networking system 4 includes a core networking device 41 and an external processor 42. In the present embodiment, the core networking device 41 and the external processor are connected through an Ethernet protocol. Moreover, a register 43 is embedded in the core networking device 41.

At first, the external processor 42 sends a read request to the core networking device 41, and then the core networking device 41 responds to the read request. However, the core networking device 41 may, according to its current status, allow or reject the read request. In the case the core networking device 41 allows, the external processor 42 then sends a write request, the core networking device 41 prepares a register status notification of the register 43 and sends the register status notification to the external processor 42 in response to the write request.

It should be noted that, the read and write requests, and all the responses as described above are transmitted in a layer 2 protocol (L2 protocol). The external processor 42, after receiving the register status notification, further acknowledges to the notification, through an ACK message.

As described, the external processor 42 and the core networking device 41 are connected through Ethernet protocol, this means that the read/write requests need to be encoded into a specific data format (a special data packet, i.e., an Ethernet protocol compatible packet format) so that the requests can be transmitted over Ethernet.

Reference is accordingly made back to FIG. 3. As described in the previous paragraph, the Ethernet protocol compatible packet format include a destination MAC (DMAC) address section 31, a source MAC (SMAC) address section 32, an Ether type section 33, a header 34 and a register access information section 35.

To be more specific, the DMAC address 31, the SMAC address 32 and the Ether type 33 sections respectively takes up 6 bytes, 6 bytes and 4 bytes in the format 3. The header 34 is for register access via Ethernet. It can be in a standard format, or can be defined by users to convey register access or event notification over Ethernet packets.

The register access information section 35 may include, but not limited to, register read/write operation, register number for addressing and content read/write from/to the register. The content for event notification is also included in this field.

Comparing to prior art, which have one or more processors and registers embedded in a core networking device, the core networking device (i.e., the core networking device 41) of the present disclosure need not to leave space for processors, since processors are out (i.e., the external processor 42). In this regard, the core networking device of the present disclosure can save more die area when manufacturing, as well as design time/cycle. Moreover, since the core networking device does not perform processor(s) accessing register (s), power consumption can be saved. Last but not the least, man power and cost can also be saved.

The present disclosure can be applied to any kinds of communication system, such as communication systems based on optical fiber, communication systems based on IEEE standard (e.g., IEEE 802.11 standard), communication systems based on 3GPP standard (e.g., 2G, 3G, 4G or 5G). For example, when the present disclosure is applied in an optical fiber communication system, the core networking device may be an optical network terminal (ONT). For another example, when the present disclosure is applied in IEEE standard complaint communication system, the core networking device may be a micro base station.

Moreover, the external processor 42 of the present disclosure is not limited to any implementation. The external processor 42 may be a system on chip (SoC) or a microcontroller unit (MCU).

In sum, by using Ethernet L2 approach for an external processor (e.g., from a third party device) to access the internal register of another (e.g., a core networking device), the external processor is counted on to handle the register access. Instead of having the core networking device to be equipped (or embedded) with a processor, more areas in the core networking device may be saved, as well as the design time/cycle when manufacturing. Also power consumption can also be saved since accessing the register is not done at the core networking device. Moreover, more manpower and costs can be saved too.

In sum, according to the description of the present disclosure, the present disclosure can be applied in all sorts of communication and networking equipment, or in all kinds of embedded applications.

According to the present disclosure, since the transmission between the core networking device and the external processor is over L2 protocol, which implies that IP address is not needed, therefore potential IP address conflicts can be prevented. Further, since only L2 protocol is involved in the present disclosure, e.g., without L3 and L4 being involved, higher layer protocols are eliminated. In this regard, the overhead in the packet header is reduced and the transmission efficiency becomes better.

Since no more processors are embedded in the core networking device, it is easier for the external processor to process without protocol overhead. The present disclosure is suitable for embedded applications, also, handshake mechanism similar to TCP protocol can also be introduced to improve resilience.

The invention claimed is:

1. A method for accessing a register of a core networking device, comprising:
    sending, by an external processor, a read request to a core networking device;
    responding, by the core networking device, to the read request;
    sending, by the external processor, a write request to the core networking device; and
    preparing, by the core networking device, a register status notification of a register and sends the register status notification to the external processor in response to the write request;
    acknowledging, by the external processor, the register status notification;
    wherein the read and write requests and the register status notification are in a layer 2 protocol (L2 protocol).

2. The method as in claim 1, wherein the external processor is implemented as a system on chip (SoC) or a microcontroller unit (MCU).

3. The method as in claim 1, wherein the L2 protocol is implemented as an Ethernet protocol compatible packet format including:
    a destination MAC address section;
    a source MAC address section;
    an Ether type section;
    a header; and
    a register access information section.

4. The method as in claim 3, wherein the destination MAC address section takes up six bytes, the source MAC address section takes up six bytes, and the Ether type section takes up four bytes.

5. A networking system, comprising:
    a core networking device having a register embedded therein; and
    an external processor, connected with the core networking device through an Ethernet protocol;
    wherein the external processor sends a read request to the core networking device, the core networking device responds to the read request, the external processor then sends a write request, the core networking device prepares a register status notification of the register and sends the register status notification to the external processor in response to the write request;
    wherein the external processor further acknowledges to the register status notification;
    wherein the read and write requests and the responses are in a layer 2 protocol (L2 protocol).

6. The networking system as in claim 5, wherein the external processor is implemented as a system on chip (SoC) or a microcontroller unit (MCU).

7. The networking system as in claim 5, wherein the L2 protocol is implemented as an Ethernet protocol compatible packet format including:
    a destination MAC address section;
    a source MAC address section;
    an Ether type section;
    a header; and
    a register access information section.

8. The networking system as in claim 7, wherein the destination MAC address section takes up six bytes, the source MAC address section takes up six bytes, and the Ether type section takes up four bytes.

* * * * *